(12) United States Patent
Gasendo

(10) Patent No.: US 7,687,931 B2
(45) Date of Patent: Mar. 30, 2010

(54) WAVE ENERGY MEGAWATTS HARVESTER

(76) Inventor: Leonardo M. Gasendo, 11238 Leisure Village Eleven, Camarillo, CA (US) 93012

( * ) Notice: Subject to any disclaimer, the term of this patent is extended or adjusted under 35 U.S.C. 154(b) by 258 days.

(21) Appl. No.: 12/075,606

(22) Filed: Mar. 13, 2008

(65) Prior Publication Data

US 2009/0230684 A1    Sep. 17, 2009

(51) Int. Cl.
*F03B 13/10*    (2006.01)
(52) U.S. Cl. .......................... 290/54; 290/43
(58) Field of Classification Search .......... 290/43, 290/44, 54, 55
See application file for complete search history.

(56) References Cited

U.S. PATENT DOCUMENTS

| | | | | |
|---|---|---|---|---|
| 659,609 A | * | 10/1900 | McIntyre | 60/506 |
| 1,393,472 A | * | 10/1921 | Williams | 290/42 |
| 3,777,494 A | * | 12/1973 | Soderlund | 60/507 |
| 3,959,663 A | * | 5/1976 | Rusby | 290/53 |
| 3,965,365 A | * | 6/1976 | Parr | 290/53 |
| 4,184,336 A | * | 1/1980 | Lamberti | 60/507 |
| 4,249,085 A | * | 2/1981 | Kertzman | 290/53 |
| 4,305,003 A | * | 12/1981 | Basurto et al. | 290/54 |
| 4,392,060 A | * | 7/1983 | Ivy | 290/53 |
| 4,599,858 A | * | 7/1986 | La Stella et al. | 60/497 |
| 4,612,768 A | * | 9/1986 | Thompson, Jr. | 60/506 |
| 5,424,582 A | * | 6/1995 | Trepl et al. | 290/53 |
| 5,929,531 A | * | 7/1999 | Lagno | 290/53 |
| 6,711,897 B2 | * | 3/2004 | Lee | 60/507 |
| 6,933,624 B2 | * | 8/2005 | Beaston | 290/43 |

\* cited by examiner

*Primary Examiner*—Nicholas Ponomarenko

(57) ABSTRACT

A wave energy megawatts harvester that enables the average size ocean waves to rotate the flywheel and power generators to 1800 rpm using the unlimited ratios, combinations and automatic transmissions of the rpm multipliers including the ratchet bearings of the drive pulleys that prevent interference to the smooth operation of the flywheel for the production of large amounts of electric current that are supplied to the towns, cities and municipalities including an option of charging the unlimited number of power battery units of the hybrid motor vehicles and electric motor vehicles.

8 Claims, 3 Drawing Sheets

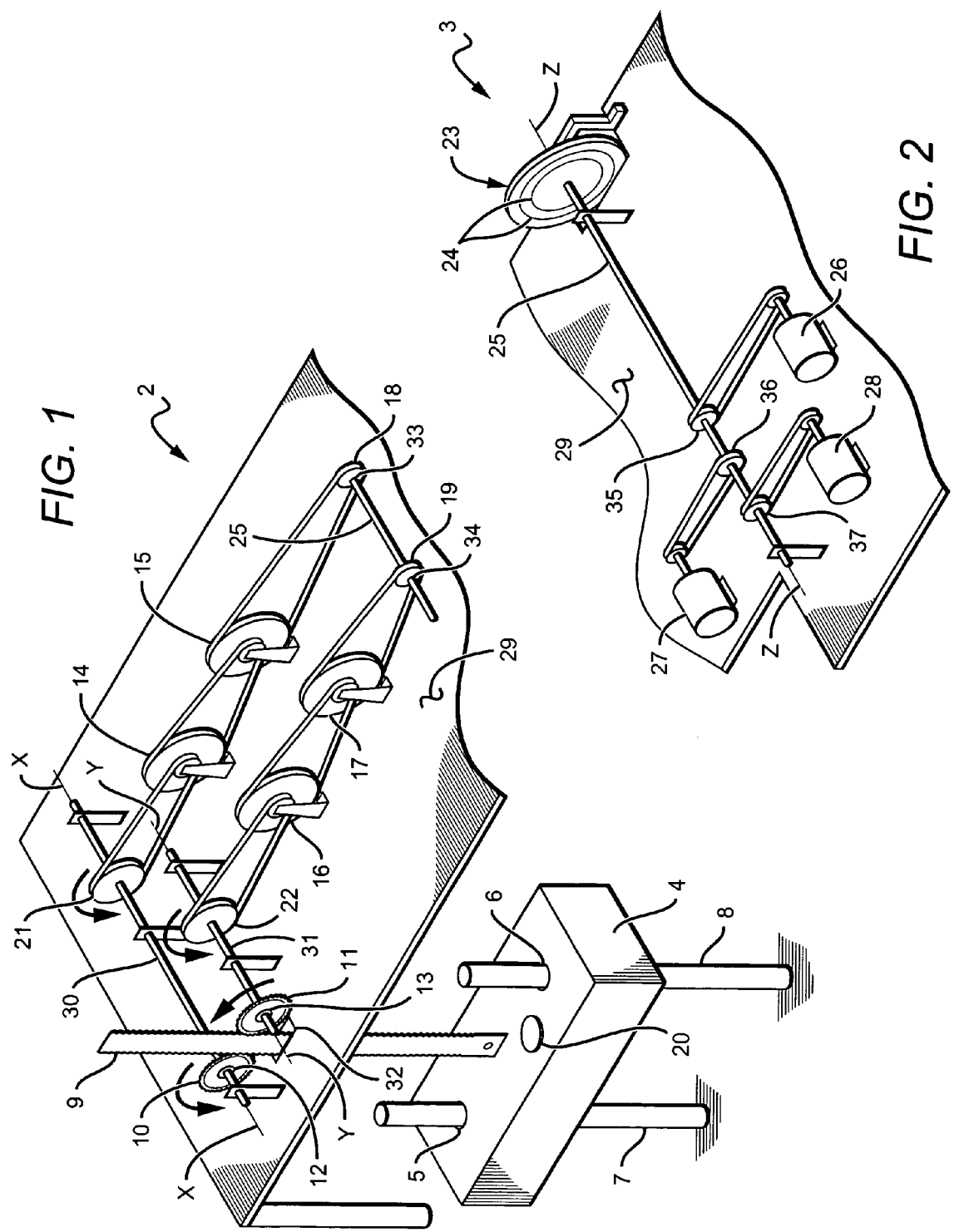

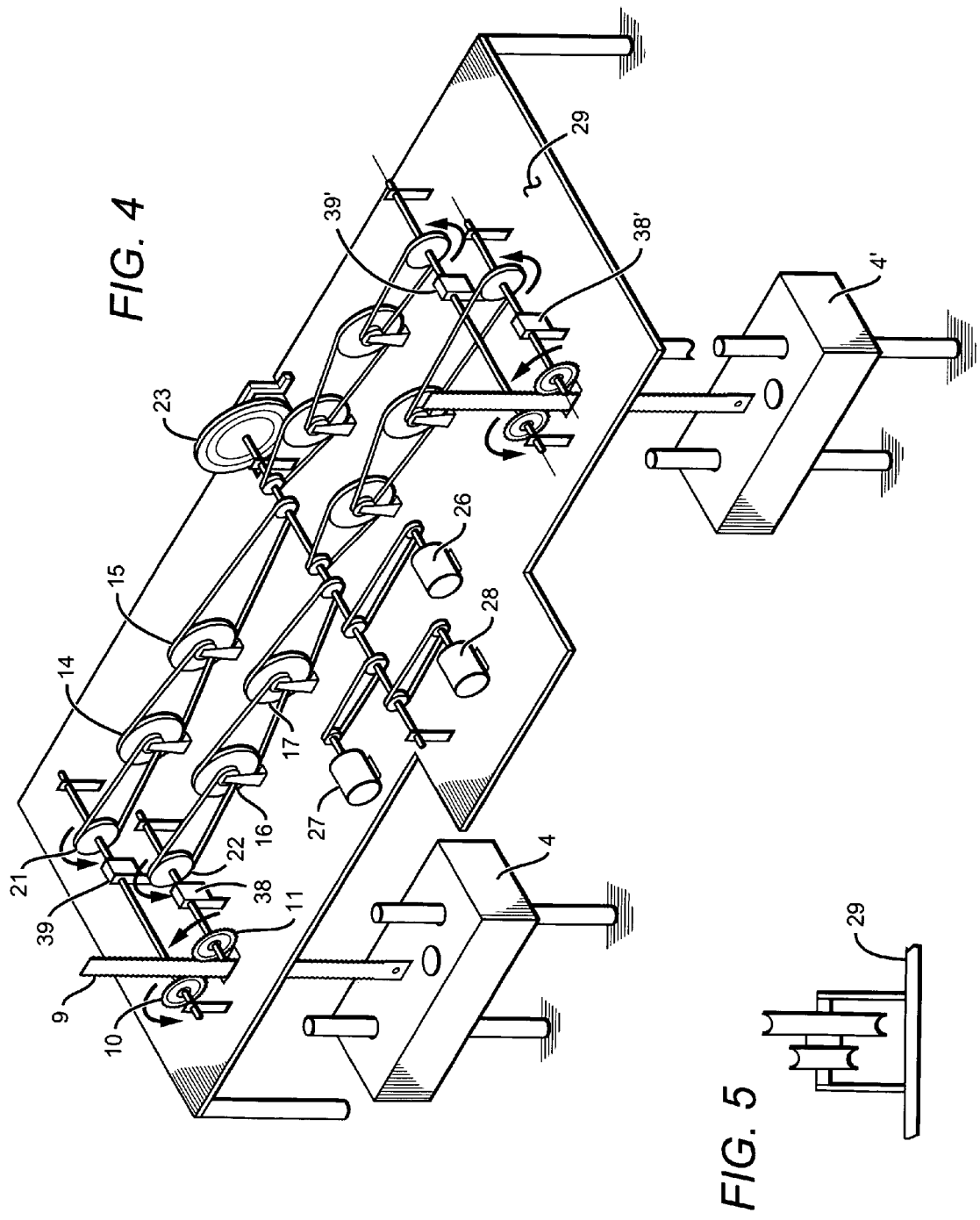

US 7,687,931 B2

WAVE ENERGY MEGAWATTS HARVESTER

REFERENCES CITED

U.S. PATENT DOCUMENTS

| 1,471,870 | October 1923 | Tust | 440/8 |
|---|---|---|---|
| 4,276,033 | June 1981 | Krovina | 440/8 |

BACKGROUND OF THE PRESENT INVENTION

At present the prices of oil are high and the people are losing their jobs, the big companies are laying off employees as part of their business retrenchment policy during economic hard times which are triggered by the high cost of energy. In order to alleviate the economic sufferings of the people it is necessary that an alternative source of cheap energy must be invented and harnessed immediately for food production as well as for other industrial applications.

A very important source of cheap energy is readily available from the waves of the ocean. Approximately 75% of the surface of the earth is water and only 25% is land. It is estimated that the total wave energy content from the ocean, if harvested and converted into electric current can supply all the electric power needs of the people.

OBJECT OF THE PRESENT INVENTION

It is the object of the present invention to provide a wave energy megawatts harvester that has the capacity to extract and convert the vast energy of the waves into cheap electric current for immediate use by the people, towns, cities and factories.

It is the object of the present invention to provide a wave energy megawatts harvester that will produce cheap electricity from the waves of the ocean for charging the power batteries of the hybrid motor vehicles and electric motor vehicles thereby reducing the discharge of hydrocarbon pollutants to the atmosphere as well as provide clean air for the people to breathe.

The other objects of the present invention will become apparent and clear from the following description of the embodiments in connection with the drawings.

BRIEF DESCRIPTION OF THE DRAWINGS

FIG. 1 is the isometric view of the extractor assembly.
FIG. 2 is the isometric view of the flywheel assembly.
FIG. 4 illustrates an isometric view of the wave energy megawatts harvester employing two floats, a plurality of rotation components and a plurality of power generators.
FIG. 5 illustrates the frontage view of the rpm multiplier.

DETAILED DESCRIPTION OF THE INVENTION

Figure 3:
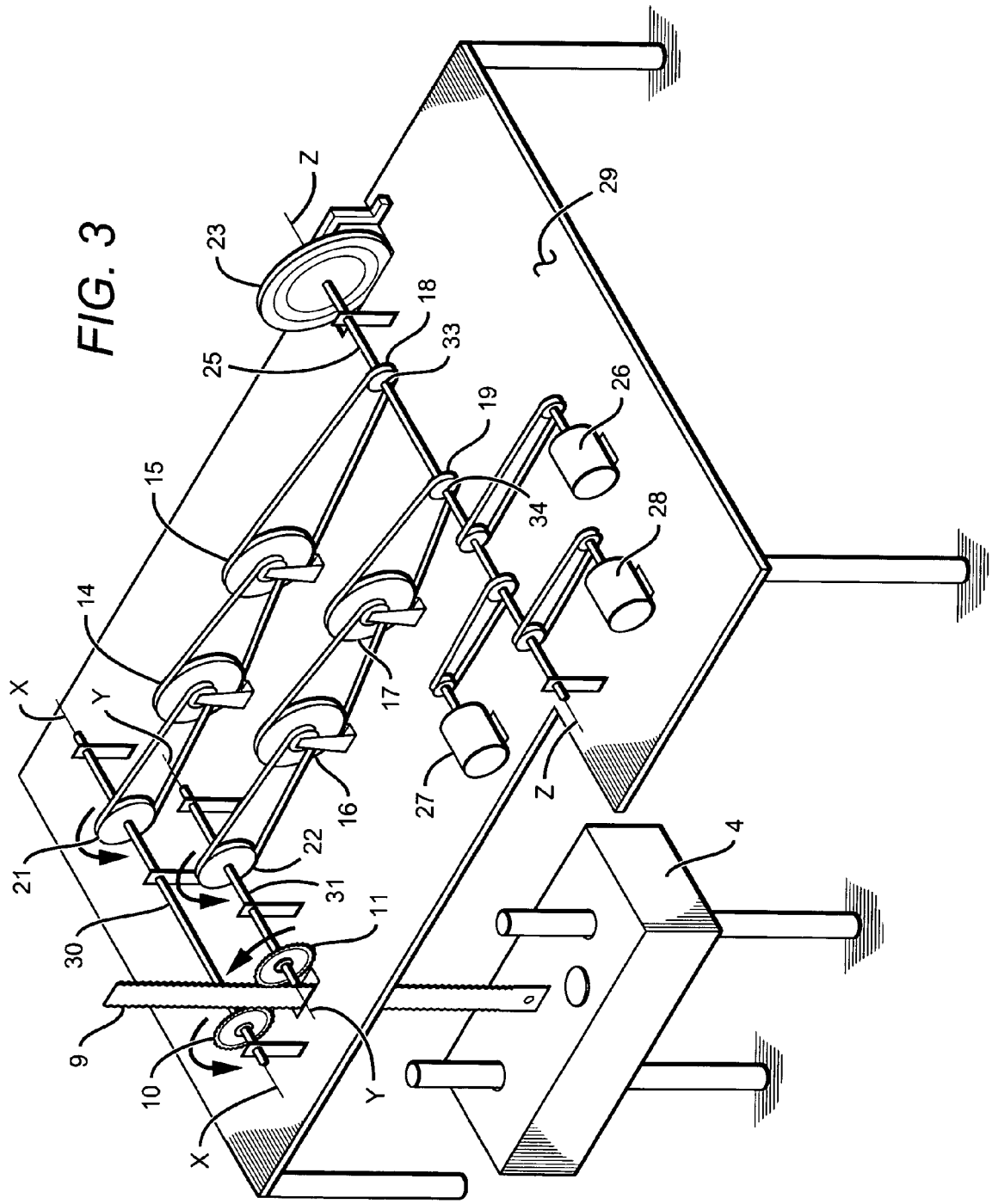
FIG. 3 is the isometric view of the wave energy megawatts harvester.

Referring to FIG. 3 the wave energy megawatts harvester 1 comprises an extractor assembly 2 FIG. 1, a flywheel assembly 3 FIG. 2, wherein the extractor assembly 2 FIG. 1 comprises a float 4 with tube guides 5 and 6, guide posts 7 and 8, toothed gear 9, circular gears 10 and 11 with ratchet bearings 12 and 13 respectively, a plurality of rpm multipliers 14, 15, 16 and 17, and a pair of flywheel drive pulleys 18 and 19.

Further in FIG. 1 the float 4 is provided with an access port 20 into which the exact amounts of lead weights are added as ballast for stability of operation as well as for additional weight force for the downwardly stroke of the toothed gear 9. The toothed gear 9 is secured to the float 4 and extends vertically through the opening 32 of the platform 29 whereupon the circular gears 10 and 11 intermesh with the toothed gear 9.

In FIG. 2 the flywheel assembly 3 comprises a flywheel 23 with a plurality of concentric channels 24 into which the exact amounts of lead weights and counterweights are inserted for rotational balancing as well as for kinetic energy storage purposes during operation, a power generation shaft 25 and a plurality of power generators 26, 27 and 28 are secured to the platform 29. The power generation shaft 25, the flywheel 23, the flywheel drive pulleys 18 and 19, and the generator drive pulleys 35, 36, and 37 rotate about the z-z axis.

The different methods of mounting the embodiment of the present invention are within the abilities of a skilled mechanic for which a detailed mounting structure is not shown and in this connection it should be understood that the drawings are for illustrative purposes only.

In FIG. 3 the drive shaft 30 rotates about the x-x axis and the drive shaft 31 rotates about the y-y axis wherein the circular gear 10 and the drive pulley 21 are secured to the drive shaft 30 and the circular gear 11 and the drive pulley 22 are secured to the drive shaft 31. As seen best in FIG. 3 the pair of triangular supports of the rpm multipliers 14, 15, 16 and 17 are secured to the platform 29. Further in FIG. 1 the drive shaft 31 rotates about the y-y axis wherein the circular gear 11 and the drive pulley 22 are secured to the drive shaft 31. The circular gear 10 rotates about the flywheel 23 via the drive pulley 21, rpm multipliers 14, 15 and flywheel drive pulley 21, rpm multipliers 14, 15 and flywheel drive pulley 18. Likewise, the circular gear 11 rotates the flywheel 23 via the drive pulley 22, rpm multipliers 16, 17 and flywheel drive pulley 19.

Further in FIG. 3 as the approaching wave moves the float 4 upwardly the toothed gear 9 rotates the circular gear 10 positively to the direction of the arrow indicating thereof while at the same time rotating the circular gear 11 neutrally to the opposite direction of the arrow indicating thereof without counter-acting or interfering with the rotation of the circular gear 10.

As the retreating wave lowers downwardly the float 4 the toothed gear 9 rotates the circular gear 11 positively to the direction of the arrow indicating thereof while at the same time rotating the circular gear 10 neutrally to the opposite direction of the arrow indicating thereof without counter-acting the rotation of the circular gear 11. The positive rotation of the circular gears 10 and 11 immediately rotates the flywheel 23 and the power generators 26, 27 and 28. During operation the ratchet bearings 33 of the flywheel drive pulley 18 and the ratchet bearings 34 of the flywheel drive pulley 19 prevent any interference to the smooth operation of the flywheel 23.

It will be appreciated by those persons knowledgeable in ocean wave energy utilization techniques that a submerged float 4 with dimensions of 10 feet wide, 30 feet long and 20 feet height is pushed to the surface of the water by a passing wave with a total force of 370,000 pounds and a submerged float 4 with dimensions of 20 feet wide, 50 feet long and 25 feet height is pushed to the surface of the water by a passing wave with a total force of 1,560,000 pounds.

In FIG. 3 as the passing wave moves the float 4 upwardly and downwardly during the operation the great force emanating from the float 4 is translated into a rotational force by the toothed gear 9 to the drive shafts 30, 31 and drive pulleys 21, 22 via the circular gears 10 and 11. Further in FIG. 3 the great rotational force from the drive pulleys 21 and 22 is used by the rpm multipliers 14, 15, 16 and 17 to enhance the rotation of the flywheel 23 and the power generators 26, 27, and 28 to 1800 rpm which is the rotational specification of the power generators 26, 27 and 28 to produce large amounts of electric current that are supplied to the towns, cities and municipalities. Most importantly during operation the ratchet bearings 33 and 34 of the flywheel drive pulleys 18 and 19 are providing interference protection to the smooth operation of the flywheel 23 irrespective of the number of float 4 units that are added to the operation of the wave energy megawatts harvester which are illustrated in FIGS. 3 and 4.

FIG. 4 illustrates the configuration of the wave energy megawatts harvester 1 that employs two floats 4 and 4' including the automatic transmissions 38, 39, 38', 39' and other operational components. With reference to FIG. 4 during high wave condition, as the flywheel 23 rotation reaches 500 rpm the automatic transmissions 38, 39, 38' and 39' immediately shift to second gear, as the flywheel 23 rotation reaches 1000 rpm the automatic transmissions 38, 39, 38' and 39' immediately shift to third gear and stay there for the duration of the high wave condition. As the high wave condition changes to low wave condition the gear shifting procedure immediately reverses in proper sequence and stays in first gear for the duration of the low wave condition.

For over-speed protection as the flywheel 23 rotation reaches 1500 rpm the power generator 26 immediately connects on-line and starts electric current production, as the power generator 26 rotation exceeds 1800 rpm the power generator 27 immediately connects on-line and starts electric current production, as the power generators 26 and 27 rotation exceeds 1800 rpm the power generator 28 immediately connects on-line and starts electric current production, as the flywheel 23 rotation starts to slow down the power generators 26, 27 and 28 immediately disconnect off-line in reverse sequence of the on-line connection.

FIG. 4 shows the means to a combined wave energy megawatts harvester 1 module that employs a plurality of floats 4, a plurality of power generators 26, 27, 28 and a plurality of other operational components for supplying large amounts of electric current to the towns, cities and municipalities including an option of charging the unlimited number of power battery units of the hybrid motor vehicles and electric motor vehicles.

In FIG. 3 the wave energy megawatts harvester 1 employs numerous operating advantages: (i) the toothed gear 9 and the circular gears 10 and 11 enable the float 4 to adjust automatically to the changing water levels of the tides that occur every day, (ii) the great force emanating from the float 4 enables the average size ocean waves to rotate the flywheel 23 and the power generators 26, 27, and 28 to 1800 rpm using the unlimited ratios and combinations of the rpm multipliers 14, 15, 16 and 17, (iii) the ratchet bearings 12 and 13 of the circular gears 10 and 11 respectively enable the tooth gear 9 to produce a positive upwardly stroke and a positive downwardly stroke for every passing wave impact, (iv) the ratios, combinations and number of units of the rpm multipliers 14, 15, 16 and 17 are easily adjusted to rotate the flywheel 23 and the power generators 26, 27 and 28 to 1800 rpm, (v) the guide posts 7 and 8, float 4, toothed gear 9, circular gears 10 and 11, rpm multipliers 14, 15, 16 and 17, flywheel drive pulleys 18 and 19 are the important configurations that enable the average size waves to rotate the flywheel 23 and power generators 26, 27 and 28 to 1800 rpm to produce large amounts of electric current that are supplied to the towns, cities and municipalities including an option of charging the unlimited number of battery power units of the hybrid motor vehicles and the electric motor vehicles; (vi) during emergency shutdowns the ratchet bearings 33 and 34 enable the flywheel 23 to continue rotating harmlessly until the forces of inertia are dissipated, (vii) the ratchet bearings 12, 13, 33 and 34 enable the forces emanating from the float to rotate safely the electric generators 26, 27 and 28 to 1800 rpm instead of allowing said forces to uproot the platform 29 from the ocean floor, and (viii) the fine-tuned smooth operating flywheel 23 enables the electric generators 26, 27 and 28 to produce more electric current of high efficiency.

The features and combinations that are illustrated and described herein represent a more advanced concepts in the wave energy megawatts harvester design and they are the significant elements of the present invention. These include all alternatives, similarities, rpm multipliers of pulleys and levers and equivalents with the broadest scope of each claim as understood in the light of the prior art.

I claim:

1. An energy harvesting apparatus for producing energy from water wave motion comprising:
    an extractor assembly; and
    a flywheel assembly mechanically connected to said extractor assembly by a power generation shaft, wherein said extractor assembly further comprises:
    a float configured for upward and downward movement in response to wave motion;
    a toothed gear attached to and extending from said float;
    a pair of circular gears intermeshed with said tooth gear;
    a pair of drive shafts, one of each said drive shafts connected to one of said circular gears; and
    a plurality of rpm multipliers connected to said drive shafts and to said power generation shaft, wherein said flywheel assembly further comprises:
    a flywheel connected to said power generation shaft; and
    a plurality of power generators connected to said power generation shaft, wherein said plurality of power generators are connected to said power generation shaft by means of pulleys.

2. The apparatus according to claim 1, wherein said rpm multipliers are connected to said power generation shaft by a plurality of pulleys.

3. The apparatus according to claim 1, wherein said float further comprises an access port for providing ballast.

4. The apparatus according to claim 1, wherein said circular gears, said drive shafts, said rpm multipliers, said flywheel, and said power generators are mounted on a common platform.

5. The apparatus according to claim 1, wherein said circular gears and said toothed gear are configured to provide power generation when said float moves upward or downward.

6. The apparatus according to claim 1, wherein said pair of circular gears each includes ratchet bearings.

7. The apparatus according to claim 1, wherein each of said pulleys include ratchet bearings.

8. The apparatus according to claim 1, wherein said pair of circular gears each includes ratchet bearings.

* * * * *